May 22, 1928.
O. N. HALL
STORAGE RAIL
Filed Oct. 26, 1927
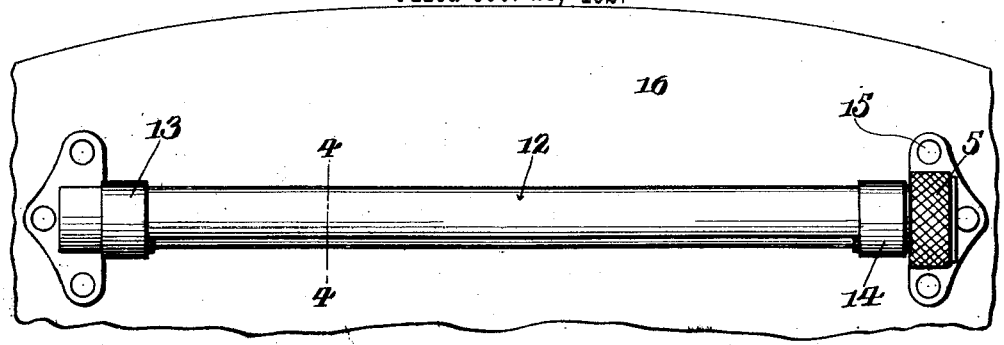
Fig.1.
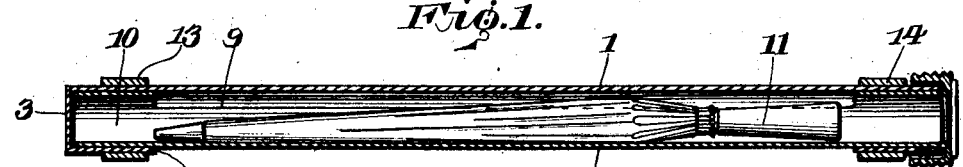
Fig.2.
Fig.3.
Fig.4.  Fig.5.
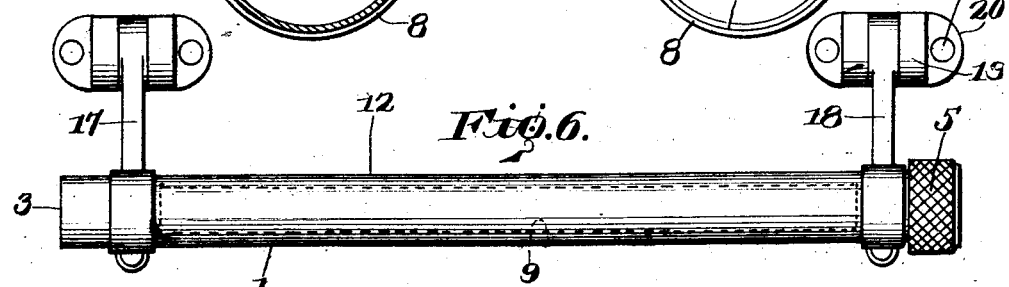
Fig.6.
INVENTOR.
Otho N. Hall,
BY Geo. P. Kimmel
ATTORNEY.

Patented May 22, 1928.

1,670,962

UNITED STATES PATENT OFFICE.

OTHO N. HALL, OF BALTIMORE, MARYLAND.

STORAGE RAIL.

Application filed October 26, 1927. Serial No. 228,965.

This invention relates to a storage rail for use in connection with automobiles and other vehicles and is designed primarily for the carrying of umbrellas and for the suspension of robes within the automobile body, but it is to be understood that a storage rail, in accordance with this invention, may be used for the storing or suspending of any article or articles for which it is found applicable, and the invention has for its object to provide, in a manner as hereinafter set forth, a storage rail for carrying and enclosing an umbrella without any inconvenience to the occupants of the vehicle, and with the rail constructed and arranged to permit of expeditiously positioning therein and removing therefrom the umbrella, when desired, without dismantling the rail or disconnecting it from its support.

Further objects of the invention are to provide, in a manner as hereinafter set forth, a storage rail for the purpose referred to which is simple in its construction and arrangement, strong, durable, compact, thoroughly efficient in its use, conveniently operated to permit of the insertion therein and removal therefrom of an umbrella or other article, readily installed with respect to the back of a seat of an automobile or with respect to the floor of the body of the automobile, pleasing in appearance, and comparatively inexpensive to set up.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a fragmentary view in rear elevation of the back of a seat showing the adaptation therewith of a storage rail in accordance with this invention and further with the rail also set up for the purpose of suspending or supporting a robe and storing an umbrella.

Figure 2 is a longitudinal sectional view of the rail.

Figure 3 is a sectional plan further illustrating the rail connected to a pair of supporting brackets therefor.

Figure 4 is a section on line 4—4 Figure 1 with the rail in closed position.

Figure 5 is a view similar to that of Figure 4 and with the rail in an opened position.

Figure 6 is a top plan view of the rail set up as a foot rest and pivotally connected with the floor of the body of a vehicle.

A storage rail in accordance with this invention includes an outer and an inner section arranged concentrically with respect to each other and further with the outer periphery of the inner section frictionally engaging with the inner periphery of the outer section. The outer section is indicated at 1 and the inner section at 2. Each section is hollow and with the section 1 closed at one end as at 3. The section 2 is open at each end and one end thereof is provided with a laterally extending annular flange 4 terminating in an inwardly directed serrated collar or sleeve 5 which surrounds the periphery of the outer-section 1. The flange 4 opposes the edge of the section 1 at the open end of the latter. The section 2 is provided with interior threads 6 at one end and engaging therewith is a flanged closure plug 7 for that end of the section 2 which is provided with the flange 4. The plug 7 extends into the section 2 and the flange of said plug abuts against the flange 4 of said section 2. The section 2 is revolubly mounted within the section 1 and the serrated collar 5 is provided to permit of conveniently revolving the section 2, relative to the section 1, when desired.

The section 1 is provided with a lengthwise extending slot 8 and the section 2 is also provided with a lengthwise extending slot 9. The slots 8 and 9 are adapted to register, when the inner section is revolved, to permit of access being had to the storage chamber 10 formed by the inner section when it is desired to insert an article, such as an umbrella 11 therein or when it is desired to remove the latter from the rail. The slots 8 and 9 preferably are of a length slightly greater than the length of the umbrella 11.

With reference to Figure 1 the rail which is referred to generally by the reference character 12 is mounted in a pair of supporting brackets 13, 14 which are secured by holdfast devices 15 to the rear of the back 16 of a seat and the brackets 13, 14 are of a length whereby the rail 12 can be employed not only for storing an umbrella or other article but also for suspending a robe or a garment.

With reference to Figure 6 the rail 12 is set up as a foot rest or foot rail and it is carried by a pair of arms 17, 18, which are pivotally connected to brackets 19, fixedly secured to the floor of the automobile body. The brackets 19 are flanged as at 20 and formed with openings 21 for the passage of holdfast devices to fixedly secure the brackets to the floor of the automobile.

The sections 1, 2 of the rail 12 can be of any desired diameter and width and said sections will be constructed of a highly polished material so that the rail when set up as a foot rest or as a robe rail will be pleasing in appearance and not mar in any manner the interior of the body of the car. Owing to the construction of the sections 1, 2, as well as their arrangement relative to each other, the section 2 can be conveniently revolved for the purpose of providing for registration of the slots 8 and 9 to enable the removal or the insertion of the umbrella or article and also for the purpose of shifting the section 2 relative to the section 1 whereby the slots 8, 9 are moved out of registration and the storage chamber 10 closed.

It is thought the many advantages of a storage rail, in accordance with this invention and for the purpose set forth, can be readily understood, and although the preferred embodiment of the invention is as illustrated and described, yet it is to be understood that changes in the details of construction can be had which will fall within the scope of the invention as claimed.

What I claim is:

1. A storage rail comprising an inner and an outer lengthwise slotted hollow section, said sections arranged concentrically to each other and one revoluble relative to the other, said outer section closed at one end and open at its other end, said inner section open at its inner end and having its outer end provided with means for overlapping the open end of the outer section, and a removable plug for closing the outer end of the inner section, said slots adapted to be brought into registration to permit of access being had to the interior of the inner section.

2. A storage rail comprising a pair of tubular members arranged concentrically to each other and provided with slots, the inner of the said members forming a storage chamber and revoluble relative to the outer member to close the slot thereof and further to provide for the registration of the slots in said members whereby access can be had to said chamber, said outer member having one end thereof closed, a sleeve carried by the inner member and surrounding the other end of said outer member, and a closure plug for that end of the inner member provided with said sleeve.

3. A storage rail comprising a pair of frictionally engaging, lengthwise slotted tubular members arranged concentrically to each other and with the inner member revoluble relative to the outer member for closing the slot of the latter and further to provide for the registration of the slots of said members whereby access can be had to the interior of the inner member, said outer member having one end closed and its other end open, a flange carried by the inner member and opposing the edge of the open end of the outer member, a sleeve integral with said flange and surrounding said outer member, and a removable plug engaging in the flanged end of said inner member for closing the same.

4. A storage rail comprising a revoluble, lengthwise slotted tubular member open at each end and providing a storage chamber, a stationary, lengthwise slotted element enclosing said member and closed at one end and open at its other end, a flange carried by said member and opposing the edge at the open end of said element, a sleeve integral with the flange and surrounding said element at its open end, and a removable closure plug engaging in the flanged end of said member.

In testimony whereof, I affix my signature hereto.

OTHO N. HALL.